(12) United States Patent
Weng et al.

(10) Patent No.: US 9,475,910 B2
(45) Date of Patent: Oct. 25, 2016

(54) ELASTOMER NANOCOMPOSITES WITH INCORPORATED PROCESS OILS

(75) Inventors: Weiqing Weng, Houston, TX (US); Bharat Bhushan Sharma, Karnataka (IN); Michael Brendan Rodgers, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 791 days.

(21) Appl. No.: 12/605,548

(22) Filed: Oct. 26, 2009

(65) Prior Publication Data

US 2011/0098405 A1    Apr. 28, 2011

(51) Int. Cl.
| | |
|---|---|
| C08L 25/08 | (2006.01) |
| B60C 1/00 | (2006.01) |
| B28B 17/00 | (2006.01) |
| C08L 23/28 | (2006.01) |
| C08J 3/215 | (2006.01) |

(52) U.S. Cl.
CPC .............. C08J 3/215 (2013.01); B60C 1/0008 (2013.04); C08J 2323/28 (2013.01); C08K 2201/011 (2013.01)

(58) Field of Classification Search
CPC .......... C08L 25/08; C08L 23/28; B60C 1/00; B28B 17/00
USPC ................................................. 524/445, 577
See application file for complete search history.

(56) References Cited

U.S. PATENT DOCUMENTS

| | | | |
|---|---|---|---|
| 7,638,573 B2 | 12/2009 | Wang et al. | |
| 2004/0132894 A1 | 7/2004 | Dias et al. | |
| 2004/0194863 A1 | 10/2004 | Grah | |
| 2005/0027057 A1 | 2/2005 | Dias et al. | |
| 2006/0167184 A1* | 7/2006 | Waddell et al. | 525/192 |
| 2006/0235128 A1 | 10/2006 | Wang et al. | |
| 2007/0015853 A1* | 1/2007 | Weng et al. | 523/333 |
| 2007/0219304 A1* | 9/2007 | Weng et al. | 524/445 |
| 2008/0015307 A1* | 1/2008 | Waddell et al. | 524/578 |
| 2008/0023118 A1* | 1/2008 | Tse et al. | 152/510 |
| 2008/0139730 A1* | 6/2008 | Waddell et al. | 524/445 |
| 2009/0005493 A1 | 1/2009 | Tse | |
| 2009/0050251 A1 | 2/2009 | Tracey et al. | |

FOREIGN PATENT DOCUMENTS

| | | | |
|---|---|---|---|
| WO | WO02/100935 | | 12/2002 |
| WO | WO2004/005387 | | 1/2004 |
| WO | WO2004/005388 | | 1/2004 |
| WO | WO2006/085957 | | 8/2006 |
| WO | WO 2007/009200 | * | 1/2007 |
| WO | WO2008/118174 | | 10/2008 |

* cited by examiner

*Primary Examiner* — James J Seidleck
*Assistant Examiner* — Deve E Valdez
(74) *Attorney, Agent, or Firm* — Nancy T. Krawczyk

(57) ABSTRACT

This disclosure is directed to nanocomposite compositions that are suitable for air bladders, innertubes, innerliners and other desirable air-retention articles. In particular, this disclosure is directed to compositions that include the nanocomposite, the nanocomposite made in such that its air-retention properties are much improved over what is known, while maintaining desirable elasticity and processability. In a particular aspect, an air-retention article such as an innerliner if formed by first contacting a desirable elastomer, especially a functionalized poly(isobutylene-co-p-methylstyrene) elastomer, with one or more layered fillers such as a clay described further below, and also contacting one or more processing aids, and one or more solvents to form an nanocomposite composition. The nanocomposite composition is then precipitated to form the solid nanocomposite composition which can be dried and further blended with other suitable ingredients such as, for example, curative agents, thus forming an innerliner suitable for a tire or other article.

26 Claims, No Drawings

ELASTOMER NANOCOMPOSITES WITH INCORPORATED PROCESS OILS

FIELD OF THE INVENTION

The present disclosure relates to elastomer-layered filler compositions also known as "nanocomposites" and their method of manufacture and inclusion in air-retention articles such as pneumatic tire innerliners.

BACKGROUND

Isobutylene-based polymer nanocomposites are used as materials of choice for tire innerliners due to their air retention properties. One example of such a nanocomposite is one comprising a functionalized poly(isobutylene-co-p-methylstyrene) elastomer and organoclay, or "layered clays" as described in US 2009-0050251. Typically, nanocomposites are made by melt mixing elastomers and clay at elevated temperature. Due to the hydrophobic and polymeric nature of butyl rubber, it is difficult to achieve a good dispersion or effective exfoliation of the clays. An earlier publication describes a novel method of making butyl rubber/clay nanocomposites, WO 2006-085957 A2. The organoclays are first treated with suitable organic solvents. The elastomer and clay, having been treated with solvents, are then blended with one another, and with exfoliating agents, to form a nanocomposite.

When such nanocomposite materials are used in innerliner compounds, a processing aid, typically naphthenic oil, is added in the innerliner formulation to ensure an adequate processing quality of the compounds. Taking advantage of the solution process for forming nanocomposites, the inventors here find a novel and beneficial way to incorporate processing aid, in the process of making nanocomposite. The resulting nanocomposite will allow a further improvement in impermeability performance by eliminating the naphthenic oils further compounding of the elastomeric nanocomposite. In addition the nanocomposites also show maintained or improved compound processability.

Publications that describe blends of elastomers and exfoliated clays include US 2004-0132894, US 2004-0194863, US 2005-0027057, US 2006-0235128, US 2007-0015853, US 2007-0219304, US 2009-0005493, and WO 2008-118174.

SUMMARY

Disclosed in certain embodiments is a method of forming an innerliner for a tire comprising contacting a functionalized poly(isobutylene-co-p-methylstyrene) elastomer with one or more layered fillers, and within the range from 1 or 2 phr to 4 or 5 or 6 or 7 or 8 phr of one or more processing aids, and one or more solvents to form a nanocomposite composition; precipitating the nanocomposite composition; and forming an innerliner suitable for a tire.

In certain embodiments, the functionalized poly(isobutylene-co-p-methylstyrene) elastomer is dispersed in a first solvent to form a first solvent mixture, and separately, the one or more layered fillers is dispersed in a second solvent to form a second solvent mixture, followed by combining the two solvent mixtures to form a nanocomposite solvent mixture; followed by combining the one or more processing aids with the nanocomposite mixture to form the nanocomposite composition.

In certain embodiments, the (first solvent):(elastomer) ratio, by weight, is within the range of from 1 or 2 or 3 to 5 or 8 or 10 or 20 or 50, and the (second solvent):(filler) ratio, by weight, is within the range of from 5 or 10 or 15 or 20 to 50 or 60 or 80 or 100 or 120 or 180 or 200.

In certain embodiments, the nanocomposite composition also comprises an exfoliating agent; preferably the layered filler is treated with the agent to create an exfoliated layered filler. In certain embodiments, the layered filler is exfoliated prior to blending with other components such as the elastomer.

In a desirable embodiment, naphthenic oils are substantially absent from the nanocomposite, the innerliner compositions, and/or all compositions disclosed herein.

Desirably, the permeation coefficient of the innerliner produced using the nanocomposites and other additives disclosed herein is less than 200 or 180 or 160 cc·mm/(m²·day).

The various descriptive elements and numerical ranges disclosed herein can be combined with other descriptive elements and numerical ranges to describe preferred embodiments of the compositions, innerliners, tires comprising innerliners and processes to make such described herein; further, any upper numerical limit of an element can be combined with any lower numerical limit of the same element to describe preferred embodiments. In this regard, the phrase "within the range from X to Y" is intended to include within that range the "X" and "Y" values.

Unless otherwise noted, values of "parts per hundred rubber", or "phr" are significant to the hundredths decimal place. Thus, the expressions "1 phr" and "60 phr" are equivalent to 1.00 phr and 60.00 phr, respectively.

Unless otherwise noted, if an amount of a component is stated, that amount is understood to be an aggregate amount if two or more different species of that component are present together.

DETAILED DESCRIPTION

Introduction

Aspects of the disclosure are directed to nanocomposite compositions that are suitable for air bladders, innertubes, innerliners and other desirable air-retention articles. In particular, this disclosure is directed to compositions that include the nanocomposite, the nanocomposite made in such a manner that its air-retention properties are much improved over what is known, while maintaining desirable elasticity and processability. In a particular aspect, an air-retention article such as an innerliner if formed by first contacting a desirable elastomer, especially a functionalized poly(isobutylene-co-p-methylstyrene) elastomer, with one or more layered fillers such as a clay described further below, and also contacting up to 8 phr of one or more processing aids, and one or more solvents to form an nanocomposite composition. The nanocomposite composition is then precipitated to form the solid nanocomposite composition which can be dried and further blended with other suitable ingredients such as, for example, curative agents, thus forming an innerliner suitable for a tire or other article.

Desirably, the making of the nanocomposite can be performed in stages, where the components are separately dissolved in solvents such as those described further below. Thus, in one embodiment, a functionalized poly(isobutylene-co-p-methylstyrene) elastomer is dispersed in a first solvent to form a first solvent mixture, and separately, the one or more layered fillers is dispersed in a second solvent to form a second solvent mixture, followed by combining the two solvent mixtures to form a nanocomposite mixture; followed by combining the one or more processing aids with the nanocomposite mixture to form the nanocomposite composition. The "first" and "second" solvents are solvents as described further below when describing suitable "solvents" in general. The first and second solvents can be the same or different, preferably they are soluble with one another, and most preferably, they are the same. The two solvent mixtures can be combined by any suitable method and in any amounts that will effectuate the desired the properties of the article it will be used in.

In desirable aspects of the disclosure, process oils are combined with the elastomer and layered filler only at the step of combining the elastomer and filler to form the nanocomposite. Preferably, no process oil is added to the already formed nanocomposite composition. Most preferably, the process oil used excludes naphthenic oils.

As used herein, a "nanocomposite" (or "nanocomposite composition") is a blend of at least one elastomer with at least one layered fillers, and in a particular embodiment a layered filler that has been treated or "exfoliated" with an exfoliating agent as described herein. As used herein, the nanocomposite may also include process oil. The composition that includes curative agents, phenolics and other "additives" is called the "innerliner composition" or more generally the "article composition."

The nanocomposite may be combined with other materials known in the art (additional oils, curatives, fillers, etc.) to produce an innerliner composition. This "green" (uncured) composition can be formed into a tube, ring or sheet and then cured by standard techniques to form a finished tire, inner tube, or other article.

Elastomeric Component

The nanocomposites described herein comprise at least one elastomer along with other components described and claimed herein. In a particular embodiment, the elastomer is an interpolymer. The interpolymer may be random elastomeric copolymers of a $C_4$ to $C_7$ isomonoolefins, such as isobutylene and a para-alkylstyrene comonomer, such as para-methylstyrene, containing at least 80%, more alternatively at least 90% by weight of the para-isomer and optionally include functionalized interpolymers wherein at least one or more of the alkyl substituents groups present in the styrene monomer units contain benzylic halogen or some other functional group. These may be referred to as functionalized poly(isobutylene-co-p-methy/styrene) ("FIMS"). In another embodiment, the interpolymer may be a random elastomeric copolymer of ethylene or a $C_3$ to $C_6$ α-olefin and a para-alkylstyrene comonomer, such as para-methylstyrene containing at least 80%, alternatively at least 90% by weight of the para-isomer and optionally include functionalized interpolymers wherein at least one or more of the alkyl substituents groups present in the styrene monomer units contain benzylic halogen or some other functional group. Exemplary materials may be characterized as interpolymers containing the following monomer units randomly spaced along the polymer chain:

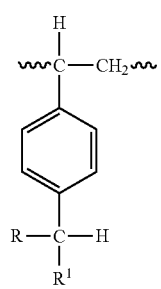

(1)

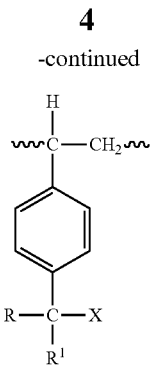

(2)

wherein R and $R^1$ are independently hydrogen, lower alkyl, such as a $C_1$ to $C_7$ alkyl and primary or secondary alkyl halides and X is a functional group such as halogen. In a particular embodiment, R and $R^1$ are each hydrogen. In certain embodiments, the amount of functionalized structure (2) is from 0.1 or 0.4 to 1 or 5 mol %.

The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445, incorporated herein by reference. In another embodiment, the functionality is selected such that it can react or form polar bonds with functional groups present in the matrix polymer of a desirable composition, for example, acid, amino or hydroxyl functional groups, when the polymer components are mixed at high temperatures. In a particular embodiment, the elastomer is halogenated poly(isobutylene-co-p-methylstyrene), and in a more particular embodiment, is brominated poly(isobutylene-co-p-methylstyrene) ("BIMS").

In certain embodiments, functionalized materials are elastomeric random interpolymers of isobutylene and para-methylstyrene containing from 0.5 to 20 mol % para-methylstyrene wherein up to 60 or 50 or 20 or 10 mol % of the methyl substituent groups present on the benzyl ring contain a bromine or chlorine atom, such as a bromine atom (para-bromomethylstyrene)). Expressed another way, the functionalized para-methylstyrene-derived units comprise within the range from 4 or 5 or 6 to 9 or 11 or 13 or 15 or 17 wt %, by weight of the elastomer.

In certain embodiments, these functionalized interpolymers have a substantially homogeneous compositional distribution such that at least 95% by weight of the polymer has a para-alkylstyrene content within 10% of the average para-alkylstyrene content of the polymer. Exemplary interpolymers are characterized by a narrow molecular weight distribution (Mw/Mn) of less than 5, alternatively less than 2.5, an exemplary viscosity average molecular weight in the range of from 200,000 up to 2,000,000 and an exemplary number average molecular weight in the range of from 25,000 to 750,000 as determined by gel permeation chromatography. In certain embodiments, the functionalized interpolymers have a Mooney Viscosity (ML1+4) of less than 50 or 45 or 40.

The interpolymers may be prepared by a slurry polymerization, typically in a diluent comprising a halogenated hydrocarbon(s) such as a chlorinated hydrocarbon and/or a fluorinated hydrocarbon including mixtures thereof, of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

The nanocomposites and/or innerliner compositions described herein may comprise one or more secondary elastomers. The secondary elastomer may comprise any one or more of natural rubber, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; poly(isobutylene-co-p-methylstyrene) and halogenated poly (isobutylene-co-p-methylstyrene), such as, for example, terpolymers of isobutylene derived units, p-methylstyrene derived units, and p-bromomethylstyrene derived units, and mixtures thereof. If present, such secondary elastomer or elastomer mixture is present within the range of from 2 or 4 or 10 to 20 or 30 or 60 or 80 phr.

Clay—Layered Filler

Nanocomposites may include at least one elastomer rubber as described above and at least one layered filler. Examples of the layered filler are certain clays, optionally, treated or pre-treated with organic molecules, particularly, exfoliating agents. In certain embodiments, the layered filler generally comprise particles containing a plurality of silicate platelets having a thickness of 8-12 Å tightly bound together at interlayer spacings of 4 Å or less, and contain exchangeable cations such as $Na^+$, $Ca^{+2}$, $K^+$ or $Mg^{+2}$ present at the interlayer surfaces. The one or more layered fillers may be present in the nanocomposite composition wherein the amount of the one or more layered fillers is within the range from 5 or 6 or 7 or 8 to 15 or 18 or 20 or 25 phr.

Layered fillers include natural or synthetic phyllosilicates, such as smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite, and combinations thereof. In certain embodiments, the layered filler has an aspect ratio of greater than 30 or 40 or 50 or 60, or within the range from 30 or 40 or 50 to 90 or 100 or 120 or 140.

The layered filler may be intercalated and exfoliated by treatment with organic molecules such or "exfoliating agents" capable of undergoing ion exchange reactions with the cations present at the interlayer surfaces of the layered silicate, termed herein as "exfoliating agents". Suitable layered fillers include cationic exfoliating agents such as ammonium, alkylamines or alkylammonium (primary, secondary, tertiary and quaternary), phosphonium or sulfonium derivatives of aliphatic, aromatic or arylaliphatic amines, phosphines and sulfides. In certain embodiments, the exfoliating agent has a weight average molecular weight of less than 5000 or 2000 or 1000 or 800 or 500 or 400 amu (and within the range from 200 or 300 to 400 or 500 or 800 or 1000 or 2000 or 5000 amu). In certain embodiments, the exfoliating agent is present in the layered filler within the range from 5 or 10 or 15 or 20 to 40 or 45 or 50 or 55 or 60 wt %, based on the weight of exfoliating agent and clay. Stated as parts per hundred rubber, the exfoliating agent is present in the layered filler within the range of from 1 or 2 to 5 or 6 or 7 or 8 phr in the nanocomposite.

In some embodiments, the layered filler may not be exfoliated, but have exchangeable cations such as $Na^+$, $Ca^{+2}$, $K^+$ or $Mg^{+2}$, etc. present instead. In these embodiments, there may be no exfoliating agent present. In yet other embodiments, there may be a mixture of metal ions and exfoliating agents present with the layered filler in the amounts specified above.

In certain embodiments, amine compounds such as tallow ammonium salts may be suitable exfoliating agents. For example, amine compounds (or the corresponding ammonium ion) are those with the structure $R^2R^3R^4N$ (each "R" bound to the nitrogen), wherein $R^2$, $R^3$, and $R^4$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so-called long chain tertiary amine, wherein at least $R^2$ is a $C_{14}$ to $C_{20}$ alkyl or alkene.

In other embodiments, a class of layered fillers include those which can be covalently bonded to the interlayer surfaces. These include polysilanes of the structure $-Si(R^5)_2R^6$ where $R^5$ is the same or different at each occurrence and is selected from alkyl, alkoxy or oxysilane and $R^6$ is an organic radical compatible with the matrix polymer of the composite.

Other exfoliating agents include protonated amino acids and salts thereof containing 2-30 carbon atoms such as 12-aminododecanoic acid, epsilon-caprolactam and like materials. Suitable exfoliating agents and processes for intercalating layered silicates are disclosed in U.S. Pat. No. 4,472,538, U.S. Pat. No. 4,810,734, U.S. Pat. No. 4,889,885 as well as WO 92-02582.

In an embodiment, the layered filler or additives are capable of reacting with the halogen sites of the halogenated elastomer to form complexes which help exfoliate the clay. In certain embodiments, the additives include all primary, secondary and tertiary amines and phosphines; alkyl and aryl sulfides and thiols; and their polyfunctional versions. Desirable additives include long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

The layered filler may be added to the composition at any stage of production; for example, the additive may be added to the elastomer, followed by addition of the layered filler, or may be added to a combination of at least one elastomer and at least one layered filler; or the additive may be first blended with the layered filler, followed by addition of the elastomer in yet another embodiment.

In certain embodiments, treatment of the elastomer with the exfoliating agents described above results in intercalation or "exfoliation" of the layered platelets as a consequence of a reduction of the ionic forces holding the layers together and introduction of molecules between layers which serve to space the layers at distances of greater than 4 Å, alternatively greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

In certain embodiments, the layered filler are clays that have already been intercalated with alkyl ammonium or other exfoliating agents and are termed "exfoliated layered filler" herein. Commercial products are available as Cloisites produced by Southern Clay Products, Inc. in Gonzalas, Tex. For example, Cloisite Na$^+$, Cloisite 30B, Cloisite 10A, Cloisite 25A, Cloisite 93A, Cloisite 20A, Cloisite 15A, and Cloisite 6A. They are also available as Somasif™ and Lucentite™ clays produced by CO-OP Chemical Co., LTD., Tokyo, Japan. For example, Somasif MAE, Somasif MEE, Somasif MPE, Somasif MTE, Somasif ME-100, Lucentite™ SPN, and Lucentite SWN.

The amount of exfoliated layered filler incorporated in the nanocomposites in accordance with certain embodiments is sufficient to develop an improvement in the mechanical properties or barrier properties of the nanocomposite, for example, tensile strength or oxygen permeability. Amounts generally will range from 0.5 to 10 wt % in one embodiment, and from 1 to 5 wt % in another embodiment, based on the polymer content of the nanocomposite. Expressed in parts per hundred rubber, the exfoliated layered filler is present in the nanocomposite within the range from 5 or 6 or 7 or 8 to 15 or 18 or 20 or 25 phr.

Producing the Nanocomposite

The nanocomposites described herein may be produced by solution processes. In certain embodiments, the solution process may be included with in situ production of the elastomer that is used in the nanocomposite composition. In an embodiment, the process may comprise contacting at least one elastomer and at least one layered filler, such as the layered filler as described above, in a solution comprising at least one solvent. This so-called "solvent" or "solution" method is described in US 2007-0219304. Methods and equipment for both lab and large-scale production, including batch and continuous processes, are well known in the art.

Suitable solvents include hydrocarbons such as alkanes, including $C_4$ to $C_{22}$ linear, cyclic, branched alkanes, alkenes, aromatics, and mixtures thereof. Examples include propane, isobutane, pentane, methycyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethylpentane, 2-methylheptane, 3-ethylhexane, 2,5-dimethylhexane, 2,24-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcyclopentane, cis-1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and mixtures thereof.

In an embodiment, the solution comprises at least one hydrocarbon. In another embodiment, the solution consists essentially of at least one hydrocarbon. In yet another embodiment, the solution comprises or consists essentially of two or more hydrocarbons. In other embodiments, the solution may comprise at least one hexane, such as cyclohexane or mixtures of hexanes. Mixtures of hydrocarbons such as mixtures of hexanes are commonly available as lower grade commercial products.

In another embodiment, suitable solvents include one or more nitrated alkanes, including $C_2$ to $C_{22}$ nitrated linear, cyclic or branched alkanes. Nitrated alkanes include, but are not limited to nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrobenzene, and the di- and tri-nitro versions of the above, and mixtures thereof. Acetonitrile is another potential solvent used alone or in combination with others.

Halogenated versions of all of the above alkanes may also be used such as chlorinated hydrocarbons, for example, methyl chloride, methylene chloride, ethyl chloride, propyl chloride, butyl chloride, chloroform, and mixtures thereof. In particular, hydrofluorocarbons may also be used as a solvent, for example, fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; and mixtures thereof and variants of these solvents as is known in the art. In certain embodiments, unsaturated hydrofluorocarbons may also be used.

In another embodiment, suitable solvents include at least one oxygenate, including $C_1$ to $C_8$ or $C_{12}$ or $C_{22}$ alcohols, ketones, ethers, carboxylic acids, esters, and mixtures thereof. Examples include ethanol, propenol, acetone, glycerol, methylethylketone, benzophenone, cyclohexanone, tetrahydrofuran, acetic acid, formic acid, dimethylether, diethylether and ethylethanoate.

In yet another embodiment, a nanocomposite is produced by a process comprising contacting at least one elastomer and at least one layered filler in at least one solvent; and removing the solvent from the contact product to form a nanocomposite. Any number of solvents, and/or combination thereof, may be used. In lieu of, or in addition to this, the nanocomposite formed by contacting the elastomer and layered filler (with or without exfoliating agent) may be precipitated by the addition of desirable solvent, in particular, a polar solvent such as an alcohol.

In certain embodiments, a nanocomposite is produced by a process comprising contacting Solution A comprising a solvent comprising a hydrocarbon and at least one layered filler; Solution B comprising a solvent and at least one elastomer; and removing the solvents from the contact product of Solution A and Solution B to form a nanocomposite. In this and other embodiments, the layered filler may be a layered filler treated with exfoliating agents as described herein.

Stated another way, in certain embodiments the elastomer is contacted by a first solvent, which can be any solvent described herein, and separately, the filler is contacted with a second solvent, which can be the same or different that the first solvent, preferably the same or at least substantially soluble in the first solvent. The elastomer and filler, independently, may be diluted in the solvent by any desirable amount. The elastomer does not have to be completely dissolved, but in certain embodiments is present with the first solvent in an amount that it is completely dissolved. The layered filler and second solvent are combined in an amount to form a suspension. In certain embodiments, the (first solvent):(elastomer) ratio, by weight, is within the range of from 1 or 2 or 3 to 5 or 8 or 10 or 20 or 50. In certain embodiments, the (second solvent):(filler) ratio, by weight, is within the range of from 5 or 10 or 15 or 20 to 50 or 60 or 80 or 100 or 120 or 180 or 200.

In certain embodiments, the solvents, collectively may be present in the production of the nanocomposite composition from 30 to 99 wt %, alternatively from 40 to 99 wt %, alternatively from 50 to 99 wt %, alternatively from 60 to 99 wt %, alternatively from 70 to 99 wt %, alternatively from 80 to 99 wt %, alternatively from 90 to 99 wt %, alternatively from 95 to 99 wt %, based upon the total weight of the composition.

Additionally, in certain embodiments, when two or more solvents are prepared in the production of the nanocomposite composition, each solvent may comprise from 0.1 to 99.9 vol %, alternatively from 1 to 99 vol %, alternatively from 5 to 95 vol %, and alternatively from 10 to 90 vol %, with the total volume of all solvents present at 100 vol %. Furthermore, water may be present in any one or more of the solvents that are used, but is preferably absent, meaning that it is not added and only present as a trace material in the solvent.

Regardless of how mixed, the compounds of nanocomposites may be prepared using a polymer/clay nanocomposite masterbatch (10× phr MB) that comprises 100 parts of polymer and X parts of clay. For example, the nanocomposite having 8 parts of clay would be used as 108 phr in the compounding formulation, including additives described further below. An example of a useful formulation (in "phr") for property evaluation would be as follows:

| Material | Example Ranges (phr) | Examples |
|---|---|---|
| Nanocomposite: | | |
| Elastomer | 100 | BIMS |
| Layered clay | 4, 5 to 6, 7, 8 or 10 | montmorillonite |
| Exfoliating agent | 0, 1, 2 to 5, 6, 7 or 8 | tallow ammonium salt |
| Carbon Black | 20, 30, 40, 50 to 70, 80 or 90 | N660 |
| Oil | <8, 7, 6, 5 or 4 | polybutene oil |
| Curatives | 0.1, 0.2 to 1, 2, 3, 4 or 5 | stearic acid, ZnO, MBTS |

Once formed by whatever means of combining the elastomer, layered fillers and solvents, the nanocomposite composition is further dried at a temperature of at least 65 or 75 or 85° C. prior to forming the innerliner. This can be accomplished under vacuum, under application of heat to drive off the solvent, or both. These can be accomplished by any suitable means known in the art.

Additives

The nanocomposites and compositions for innerliners and/or tires disclosed herein typically include other additives customarily used in rubber mixes, such as effective amounts of processing aids, pigments, accelerators, crosslinking and curing materials, antioxidants, antiozonants. General classes of accelerators include amines, diamines, guanidines, thioureas, thiazoles, thiurams, sulfenamides, sulfenimides, thiocarbamates, xanthates, and the like. Crosslinking and curing agents include sulfur, zinc oxide, and fatty acids. Peroxide cure systems may also be used.

The innerliner and tire components described herein may include fillers other than the exfoliated clay. The one or more fillers, in addition to the clay added to the elastomer to form the nanocomposite, may be fillers known in the art such as, for example, calcium carbonate, silica, clay and other silicates which may or may not be exfoliated, talc, titanium dioxide, and carbon black. Silica is meant to refer to any type or particle size silica or another silicic acid derivative, or silicic acid, processed by solution, pyrogenic or the like methods and having a surface area, including untreated, precipitated silica, crystalline silica, colloidal silica, aluminum or calcium silicates, fumed silica, and the like. In particular embodiments, the filler is present within the range from 20 or 30 or 40 or 50 to 70 or 80 or 90 phr.

One or more crosslinking agents, such as a coupling agent, may also be used, especially when silica is also present in the composition. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, bis-(3-triethoxysilypropyl)tetrasulfide, vinyl-tris-(beta-methoxyethoxy)silane, methacryloylpropyl-trimethoxysilane, gamma-amino-propyl triethoxysilane (sold commercially as A1100 by Witco), gamma-mercapto-propyltrimethoxysilane (A189 by Witco) and the like, and mixtures thereof.

In one embodiment, the additional filler is carbon black or modified carbon black, and combinations of any of these. In another embodiment, the filler may be a blend of carbon black and silica. In a particular embodiment, the filler used in the tire and innerliner components is reinforcing grade carbon black present at a level of from 10 to 100 phr of the blend, more preferably from 30 to 80 phr in another embodiment, and from 50 to 80 phr in yet another embodiment. Useful grades of carbon black, as is well known in the art, range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, tire sidewalls, are N330, N351, N550, N650, N660, and N762. Carbon blacks suitable for innerliners and other air barriers include N550, N660, N650, N762, N990, and Regal 85.

Generally, polymer blends, for example, those used to produce tires, are crosslinked or "cured". It is known that the physical properties, performance characteristics, and durability of vulcanized rubber compounds are directly related to the number (crosslink density) and type of crosslinks formed during the vulcanization reaction. Generally, polymer blends may be crosslinked by adding curative molecules, for example sulfur, metal oxides, organometallic compounds, radical initiators, etc., followed by heating. In particular, the following metal oxides are common curatives that can be useful: ZnO, CaO, MgO, $Al_2O_3$, $CrO_3$, FeO, $Fe_2O_3$, and NiO. These metal oxides can be used alone or in conjunction with the corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof (e.g., Diak™ products sold by DuPont). This method of curing elastomers may be accelerated and is often used for the vulcanization of elastomer blends. Such components as the metal oxides and sulfur may be present to within the range of from 0.1 or 0.2 to 1 or 2 or 3 phr, each.

The acceleration of the cure process is accomplished in certain embodiments by adding to the composition an amount of an accelerant. The mechanism for accelerated vulcanization of natural rubber involves complex interactions between the curative, accelerator, activators and polymers. Ideally, all of the curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthi-uram disulfide (TBTD), benzothiazyl disulfide (MBTS), hexamethylene-1,6-bisthiosulfate disodium salt dihydrate (sold commercially as Duralink™ HTS by Flexsys), 2-(morpholinothio) benzothiazole (MBS or MOR), blends of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), and "thioureas." Accelerants may be present to within the range of from 0.1 or 0.2 to 1 or 2 or 3 phr.

Taken together, such agents as accelarants, metal oxides, sulfur and other "curatives" may be present in the compositions described herein within the range of from 0.1 or 0.2 to 1 or 2 or 3 or 4 or 5 phr.

In other embodiments, desirable elastomer impermeability is achieved by the presence of at least one polyfunctional curative. An embodiment of such polyfunctional curatives can be described by the formula Z—$R^7$—Z', wherein $R^7$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So called bis-thiosulfate compounds are an example of a class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are well known in the art. The polyfunctional curative, if present, may be present in the nanocomposite from 0.1 to 8 phr in one embodiment, and from 0.2 to 5 phr in yet another embodiment.

Phenol formaldehyde resins (or "phenolic resins") are used as a curative in certain embodiments. In one embodiment, only one type of phenol formaldehyde resin is used, in another embodiment a mixture of two or more types of phenyl formaldehyde resins is sued. In one embodiment, the phenol formaldehyde resin is selected from the group consisting of structures (3):

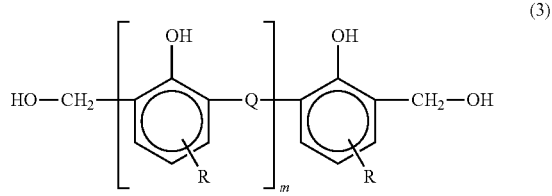

(3)

wherein m ranges from 1 to 50, more preferably from 2 to 10; R is selected from the group consisting of hydrogen and $C_1$ to $C_{20}$ alkyls in one embodiment; and is selected from the group consisting of $C_4$ to $C_{14}$ branched alkyls in a particular embodiment; and Q is a divalent radical selected from the group consisting of —$CH_2$—, and —$CH_2$—O—$CH_2$—.

In certain embodiments, the phenol formaldehyde resin is halogenated, and in yet other embodiments, a mixture of halogenated and non-halogenated phenol formaldehyde resin is used. Also, the phenol formaldehyde resin may be in any form such as a solid, liquid, solution or suspension. Suitable solvents or diluents include liquid alkanes (e.g., pentane, hexane, heptane, octane, cyclohexane), toluene and other aromatic solvents, paraffinic oils, polyolefinic oils, mineral oils, or silicon oils, and blends thereof. In certain embodiments, the compositions, innerliner and/or tires described herein may comprise within the range from 1 or 2 or 3 to 6 or 8 or 10 or 12 phr of at least one phenolic resin.

A processing aid, or "oil," may also be included. Processing aids include, but are not limited to, plasticizers, extenders, chemical conditioners, homogenizing agents and peptizers such as mercaptans, petroleum and vulcanized vegetable oils, mineral oils, paraffinic oils, polybutene polymers, naphthenic oils, aromatic oils, waxes, resins, rosins, and the like. The processing aid is present from less than 8 or 7 or 6 or 5 or 4 phr in certain embodiments, or within the range from 0.1 or 0.5 or 1 or 2 or 3 or 4 to 6 or 8 phr in other embodiments.

Some commercial examples of processing aids are Sundex™ (Sun Chemicals), a naphthenic processing aid, polybutene processing aid having a number average molecular weight of from 800 to 5000 amu, and Flexon™, a paraffinic petroleum oil. In one embodiment, paraffinic, naphthenic and aromatic oils are substantially absent, meaning, they have not been deliberately added to the compositions used to make the air barriers, or, in the alternative, if present, are only present up to 0.2 wt % of the compositions used to make the air barriers. In another embodiment of compositions, naphthenic and aromatic oils are substantially absent. Commercial examples of these include, for example, Flexon oils (which contain some aromatic moieties) and Calsol™ oils (naphthenic oil).

Most preferably, naphthenic oils are substantially absent from the nanocomposites and/or innerliner (article) compositions, meaning that if naphthenic oils are present at all, they are only present to less than 0.5 or 0.1 wt % of the composition. An oil is "naphthenic" if its paraffinic carbon content is less than 60 wt % by weight of the oil.

In another embodiment, other additives can be present such as tackifiers and polymers such as plastomers and thermoplastics. Useful plastomers comprise ethylene derived units and from 10 wt % to 30 wt % of $C_3$ to $C_{10}$ α-olefin derived units. In another embodiment, the plastomer comprises ethylene derived units and from 10 wt % to 30 wt % of units selected from 1-butene, 1-hexene and 1-octene derived units. In yet another embodiment, the plastomer comprises ethylene derived units and from 10 wt % to 30 wt % of octene derived units. In an embodiment, the plastomer has a melt index of from 0.1 to 20 dg/min, and from 0.1 to 10 dg/min in another embodiment. Examples of commercially available plastomers are Exact™ 4150, a copolymer of ethylene and 1-hexene, having a density of 0.895 g/cm³ and melt index (2.16/190) of 3.5 dg/min (ExxonMobil Chemical Company, Houston, Tex.); and Exact 8201, a copolymer of ethylene and 1-octene, having a density of 0.882 g/cm³ and melt index (2.16/190) of 1.0 dg/min.

In certain embodiments, tackifiers may be present in the innerliners and/or tire components, and may also be referred to in the art as hydrocarbon resins, include low molecular weight amorphous, thermoplastic polymers derived from synthetic or natural monomers. These monomers include those derived from petroleum resins including trans-piperylene, aromatics such as styrene, 2-methyl-2-butene; terpene resins including limonene, and β-pinene; rosins such as abietic acid; and various cyclodienes. The resins may be hydrogenated. A commercial example of a tackifier is Struktol™ hydrocarbon resins (Struktol Company of America). In certain embodiments, the tackifier or plastomer is present in the innerliner compositions within the range from 2 or 3 or 4 or 5 to 8 or 10 or 12 or 15 phr.

Producing the Innerliner and Pneumatic Tire

The compositions of the described herein and layered structures formed using such compositions can be used in pneumatic tire applications; tire curing bladders; air sleeves, such as air shock absorbers, diaphragms; and hose applications, including gas and fluid transporting hoses. The compositions and tie layer comprising such compositions are particularly useful in pneumatic tires to facilitate the adhesion and air holding qualities of a tire innerliner to the inner surface of the tire. An especially useful construction is one in which a tire innerliner layer forms the innermost surface of the tire and the innerliner layer surface opposite the one that forms the air holding chamber is in contact with the tie layer. Alternatively, an adhesive layer can be used between the innerliner layer and the tie layer. The surface of the tie layer opposite the one that is in contact with the innerliner (or adhesive layer) is in contact with the tire layer referred to as the carcass; in other words, the tire layer typically comprising reinforcing tire cords. The innerliner layer exhibits advantageously low permeability properties and preferably comprises the nanocomposite.

Furthermore, as a consequence of the unique composition of the innerliner, in particular its low air permeability property, allows for the use of a thin innerliner compared to compositions containing primarily high diene rubber. The resulting overall structure based on such innerliner allows for a tire construction (as well as other constructions comprising an air or fluid holding layer and tie layer) having reduced weight. Naturally, adjustment of the concentration and type of halogenated elastomer in the tie layer, compositional adjustments in the innerliner layer and selection of the thickness of each of these layers can result in different weight savings. Typically, the air holding (or fluid holding in the case of applications other than tires) characteristics determine choice of such variables and limited experimentation can be used by the compounder and/or designer to assist in making such decisions. However, typically 2% to 16% weight savings can be realized; alternatively, 4% to 13% weight savings. Such improvements are particularly meaningful in an application such as pneumatic tires.

The tire innerliner composition (i.e., the nanocomposite and additional components) may be prepared by using conventional mixing techniques including, for example, kneading, roller milling, extruder mixing, internal mixing (such as with a Brabender™ or Banbury™ mixer) etc. The sequence of mixing and temperatures employed are well known to the rubber compounder of ordinary skill in the art, the objective being the dispersion of fillers, activators and curatives in the polymer matrix under controlled conditions of temperature that will vary depending on the nature of the nanocomposite. Alternatively, the rubber and a portion of the carbon black (e.g., one-third to two thirds) are mixed for a short time (e.g., 1 to 3 minutes) followed by the remainder of the carbon black and oil. Mixing is continued for 5 to 10 minutes at high rotor speed during which time the mixed components reach a temperature of 160° C. Following cooling, the components are mixed in a second step, for example, on a rubber mill or in a Banbury mixer, during which the cure system, e.g., curing agent and optional accelerators, are thoroughly and uniformly dispersed at relatively low temperature, for example, 90 to 105° C., to avoid premature curing or "scorching" of the composition. Variations in mixing will be readily apparent to those skilled in the art this disclosure is not limited to any specific mixing procedure. The mixing is performed to disperse all components of the composition thoroughly and uniformly.

The innerliner layer or "stock" is then prepared by calendering or extruding the compounded rubber composition into sheet material having a thickness of 0.5 mm to 2 mm and cutting the sheet material into strips of appropriate width and length for innerliner application in a particular size or type tire. The innerliner is then ready for use as an element in the construction of a pneumatic tire. The pneumatic tire is typically comprised of a multilayered laminate comprising an outer surface which includes the tread and sidewall elements, an intermediate carcass layer which comprises a number of plies containing tire reinforcing fibers, (e.g., rayon, polyester, nylon or metal fibers) embedded in a rubbery matrix, a tie layer as described herein, an optional adhesive layer, and an innerliner layer. Tires are normally built on a tire forming drum using the layers described above. After the uncured tire has been built on the drum, it is removed and placed in a heated mold.

The mold contains an inflatable tire shaping bladder that is situated within the inner circumference of the uncured tire. After the mold is closed the bladder is inflated and it shapes the tire by forcing it against the inner surfaces of the closed mold during the early stages of the curing process. The heat within the bladder and mold raises the temperature of the tire to vulcanization temperatures. Vulcanization temperatures are typically 100° C. to 250° C.; preferably 150° C. to 200° C. Cure time may vary from 8 minutes to several hours for the tires described herein. Cure time and temperature depend on many variables well known in the art, including the composition of the tire components, including the cure systems in each of the layers, the overall tire size and thickness, etc.

Vulcanization parameters can be established with the assistance of various well-known laboratory test methods, including the test procedure described in ASTM D2084-01, (Standard Test Method for Rubber Property-Vulcanization Using Oscillating Disk Cure Meter) as well as stress-strain testing, adhesion testing, flex testing, etc. Vulcanization of the assembled tire results in complete or substantially complete vulcanization (or "crosslinking", "curing") of all elements or layers of the tire assembly, i.e., the innerliner, the carcass and the outer tread and sidewall layers. In addition to developing the desired strength characteristics of each layer and the overall structure, vulcanization enhances adhesion between these elements, resulting in a cured, unitary tire from what were separate, multiple layers.

In certain embodiments, the nanocomposite compositions and innerliners made using the nanocomposite compositions described herein, and tires made therefrom, possess a permeation coefficient of less than 200 or 180 or 160 or 140 or 100 mm·cm$^3$/[m$^2$·day] at 40° C., or in another embodiment, within the range of from 100 to 140 or 160 or 180 or 200 mm·cm$^3$/[m$^2$·day] at 40° C.

EXAMPLES

In these experiments, and as described in the Tables, "Nano 1" comprises brominated poly(isobutylene-co-p-methylstyrene) elastomer (10 wt % para-methylstyrene and 0.8 mole % bromine, both by weight and mole of the elastomer) with 10 phr Cloisite™ 20A and 5 phr Castro™ oil. This elastomer is made by techniques known in the art and disclosed at, for example, U.S. Pat. No. 5,162,445. "Nano 2" is the same, except comprising 5 phr polybutene oil (about 2500 amu). "Nano 3" is the same, but with no processing aid added.

Example

Brominated poly(isobutylene-co-p-methylstyrene) elastomer (150 g) was dissolved in hexane (900 mL) and Cloisite 20A clay (15 g) was dispersed in hexane (700 mL). The polymer solution and clay slurry were combined and Castro oil (7.5 g) was added. The mixture was further mixed in a Silverson High-Shear mixer at ambient temperature for 30 min. The nanocomposite was precipitated by addition of iso-propanol. The product was filtered and dried in a vacuum oven at 85° C. for 18 hours. The final composition was 10 phr Cloisite and 5 phr Castro oil.

Example 2

Brominated poly(isobutylene-co-p-methylstyrene) elastomer (150 g) was dissolved in hexane (900 mL) and Cloisite 20A clay (15 g) was dispersed in hexane (700 mL). The polymer solution and clay slurry were combined and polybutene oil (7.5 g) was added. The mixture was further mixed in a Silverson High-Shear mixer at ambient temperature for 30 min. The nanocomposite was precipitated by addition of iso-propanol. The product was filtered and dried in a vacuum oven at 85° C. for 18 hours. The final composition was 10 phr Cloisite and 5 phr polybutene oil.

The nanocomposites (Nano 1 and Nano 2) formed in Examples 1 and 2 above, respectively, were used to make nanocomposite compositions by blending with the other ingredients listed in Table 1. The comparative example 2 is made using a bromobutyl rubber ("BIIR"), ExxonMobil Bromobutyl 2222 (ExxonMobil Chemical Co.), and the components are blended in a Brabender™ mixer in a conventional manner. The nanocomposites (or "nanocomposite compositions") are blended with other additives to form innerliner compositions. The "phenolic resin" is obtained from Schenectady International, Inc. In all cases, the nanocomposites and bromobutyl rubber are blended with the additional components in a Brabender mixer in a conventional manner. The other ingredients are obtained from conventional suppliers known in the art. Testing of samples made from the compositions in Table 1 was performed and the results presented in Tables 2 and 3. The "gauge" is alternatively termed the thickness of the sample.

Permeability

Permeability testing proceeded according to the following description. All examples were compression molded with slow cooling to provide defect free pads. A compression and curing press was used for rubber samples. Typical thickness of a compression molded pad is around 0.38 to 0.47 mm using an Arbor press, 2 inch diameter disks were then punched out from molded pads for permeability testing. The oxygen permeation measurements were done using a Mocon OX-TRAN 2/61 permeability tester at 40° C. under the principle of R. A. Pasternak et. al. in 8 J. POLY. SCI.: PART A-2 467 (1970). Disks thus prepared were mounted on a template and sealed with a vacuum grease. A steady flow of oxygen at 10 mL/min was maintained on one side of the disk, while a steady flow of nitrogen at 10 mL/min was maintained on the other side of the disk. Using the oxygen sensor on the nitrogen side, increase in oxygen concentration on the nitrogen side with time could be monitored. The time required for oxygen to permeate through the disk, or for oxygen concentration on the nitrogen side to reach a constant value, is recorded and used to determine the oxygen gas permeability.

Mooney Stress Relaxation

The method used to measure the Mooney viscosity and relaxation values herein are based on the use of the instrument used, Alpha Technologies MV-2000 Mooney Viscometer Instruction Manuals, and ASTM D3182 *Practice for Rubber—Materials, Equipment, and Procedures for Mixing Standard Compounds and Preparing Standard Vulcanized sheets*; and ASTM D1646 *Standard test methods for rubber—Viscosity, Stress Relaxation & Pre-Vulcanization Characteristics (Mooney Viscometer)*. Calibration includes calibrating the frequency—A calibration check was performed once every 14 days and when out of calibration conditions exist; and Acceptance Limits—The Mooney units at dead weight calibration should read 100 MU±0.5 MU; the temperature was 100±0.3° C. The control polymer was ExxonMobil Butyl 268. The control is run by placing the control sample (Butyl 268) to condition for 30 minutes. Then, using an MV cutter, 2 samples were cut to the known thickness, such that each one weighs approximately around 11.5 g. The control polymer was run each day before the first sample was tested. The sample size is 23.0±3.0 grams and was run with Mylar™ sheet. The control testing consisted of a one-minute preheat and eight-minute run. This was done by using the large rotor. The test temperature was 125° C.±0.3° C. The charting parameter is the Mooney value at 1+8 minutes.

In measuring the Mooney values, the samples were prepared by milling to dryness, when necessary, on a mill set at 90° C.±5° C., except that "dense-baled" elastomer samples did not require milling. Massing involves 10 passes at a suitable gauge depending on the polymer. If the sample has been mill massed, allowing the test sample to cool to room temperature for 30 minutes, or actively cool it in a cooling chamber. This cooling step may occur before or after folding. Then the milled sample was folded to a thickness of about a half an inch, which should be free from trapped air. Die out 2 pieces of samples using the Mooney cutter. For an unmassed specimen, slice to a thickness of about half an inch and directly die out 2 pieces of the material being tested using the Mooney cutter, so that the sample pieces gets hole at the center. The specimens were then weighted. The combined volume of the two test pieces was 25±3 cm$^3$. The mass of the two pieces was 27±3 g for materials having a specific gravity of 1.1 or less. For materials having a specific gravity of more than 1.1, increase the mass according to the following equation: Target weight=SG/1.1×27 g, where "SG" is the specific gravity of the material.

TABLE 1

Innerliner Compositions

| Compound | Example 1 | Example 2 | Comparative Example 1 | Comparative Example 2 |
| --- | --- | --- | --- | --- |
| BIIR 2222 | — | — | — | 100.00 |
| Nano 1 | 115.00 | — | — | — |
| Nano 2 | — | 115.00 | — | — |
| Nano 3 | — | — | 110.00 | — |
| N660 | 60.00 | 60.00 | 60.00 | 60.00 |
| Naphthenic oil | — | — | 3.50 | 8.00 |
| Struktol 40MS | 7.00 | 7.00 | 7.00 | 7.00 |
| Phenolic Resin SP-1068 | 4.00 | 4.00 | 4.00 | 4.00 |
| Stearic acid | 1.00 | 1.00 | 1.00 | 1.00 |
| ZnO | 1.00 | 1.00 | 1.00 | 1.00 |
| MBTS | 1.25 | 1.25 | 1.25 | 1.25 |
| Sulfur | 0.50 | 0.50 | 0.50 | 0.50 |
| Total phr lab | 189.75 | 189.75 | 188.25 | 182.75 |
| S.G | 1.177 | 1.178 | 1.187 | 1.130 |

TABLE 2

Mooney ML(1 + 8) Stress Relaxation

| Compound | Example 1 | Example 2 | Comparative Example 1 | Comparative Example 2 |
|---|---|---|---|---|
| Test temp, ° C. | 100 | 100 | 100 | 100 |
| Test time, min. | 8 | 8 | 8 | 8 |
| Preheat, min. | 1 | 1 | 1 | 1 |
| Decay, min. | 1 | 1 | 1 | 1 |
| Mm, MU | 39.6 | 54.4 | 56.9 | 50.7 |
| tMm, min. | 8 | 8 | 7.8 | 7.8 |
| Visc@4, MU | 44.2 | 55.5 | 58.9 | 51.4 |
| Visc@8, MU | 39.6 | 54.4 | 57 | 50.8 |
| Visc@8.01, MU | 28.3 | 40.9 | 42.4 | 38.6 |
| Visc@8.02, MU | 17.3 | 26.1 | 26.7 | 23.9 |
| Visc@8.10, MU | 8.4 | 12.3 | 12.3 | 9.7 |
| Slope, MU/min | −0.52 | −0.49 | −0.52 | −0.59 |
| Intercept, MU | 20.3 | 29.3 | 30.3 | 27.3 |
| R. Coeff | −0.997 | −0.999 | −0.999 | −0.999 |
| Decay t90 | 23.7 | 29.7 | 25.2 | 17.8 |

TABLE 3

Permeability Test

| Compound | Example 1 | Example 2 | Comparative Example 1 | Comparative Example 2 |
|---|---|---|---|---|
| *First Measurement* | | | | |
| Temp, ° C. | 40 | 40 | 40 | 40 |
| oxygen, % | 100 | 100 | 20.9 | 100 |
| Gauge, mm | 0.41 | 0.41 | 0.44 | 0.39 |
| Material Area, cm$^2$ | 10 | 10 | 10 | 10 |
| Barometer, mmHg | 753.7 | 753.4 | 754.8 | 751.8 |
| Trans Rate, cc/(m$^2$-day) | 292.7 | 301.4 | 314.0 | 535.1 |
| Permeation Coefficient, cc · mm/(m$^2$-day) | 119.4 | 109.0 | 138.5 | 208.5 |
| *Second Measurement* | | | | |
| Temp, ° C. | 40 | 40 | 40 | 40 |
| oxygen, % | 100 | 100 | 20.9 | 100 |
| Gauge, mm | 0.43 | 0.46 | 0.45 | 0.40 |
| Material Area, cm$^2$ | 10 | 10 | 10 | 10 |
| Barometer, mmHg | 753.3 | 753.4 | 754.0 | 751.8 |
| Trans Rate, cc/(m$^2$-day) | 255.3 | 234.3 | 310.4 | 527.8 |
| Permeation Coefficient, cc · mm/(m$^2$-day) | 122.4 | 108.2 | 138.1 | 211.5 |
| Mean Permeation Coefficient, cc · mm/(m$^2$-day) | 120.9 | 108.6 | 138.3 | 210.0 |

Having described the various features of the nanocomposites and innerliner (or article) compositions, described herein in numbered embodiments is:

1. A method of forming an innerliner for a tire comprising: contacting a functionalized poly(isobutylene-co-p-methylstyrene) elastomer with one or more layered fillers, and within the range from 1 or 2 phr to 4 or 5 or 6 or 7 or 8 phr of one or more processing aids, and one or more solvents to form a nanocomposite composition; precipitating the nanocomposite composition; and forming an innerliner suitable for a tire.

2. The method of numbered embodiment 1, wherein the functionalized poly(isobutylene-co-p-methylstyrene) elastomer is dispersed in a first solvent to form a first solvent mixture, and separately, the one or more layered fillers is dispersed in a second solvent to form a second solvent mixture, followed by combining the two solvent mixtures to form a nanocomposite solvent mixture; followed by combining the one or more processing aids with the nanocomposite mixture to form the nanocomposite composition.

3. The method of numbered embodiment 2, wherein the (first solvent):(elastomer) ratio, by weight, is within the range of from 1 or 2 or 3 to 5 or 8 or 10 or 20 or 50, and the (second solvent):(filler) ratio, by weight, is within the range of from 5 or 10 or 15 or 20 to 50 or 60 or 80 or 100 or 120 or 180 or 200.

4. The method of any one of the previously numbered embodiments, wherein the nanocomposite composition is further dried at a temperature of at least 65 or 75 or 85° C. prior to forming the innerliner.

5. The method of any one of the previously numbered embodiments, wherein the functionalized poly(isobutylene-co-p-methylstyrene) elastomer has a Mooney Viscosity (ML1+4) of less than 50 or 45 or 40.

6. The method of any one of the previously numbered embodiments, wherein the functionalized poly(isobutylene-co-p-methylstyrene) elastomer has a p-methylstyrene-derived content within the range from 4 or 5 or 6 to 9 or 11 or 13 or 15 or 17 wt %, by weight of the elastomer.

7. The method of any one of the previously numbered embodiments, wherein the amount of the one or more layered fillers is within the range from 5 or 6 or 7 or 8 to 15 or 18 or 20 or 25 phr.

8. The method of any one of the previously numbered embodiments, wherein the nanocomposite composition also comprises an exfoliating agent.

9. The method of numbered embodiment 8, wherein the exfoliating agent has a weight average molecular weight of less than 5000 or 2000 or 1000 or 800 or 500 or 400 amu (and within the range from 200 or 300 to 400 or 500 or 800 or 1000 or 2000 or 5000 amu).

10. The method of any one of numbered embodiments 8-9, wherein the exfoliating agent is present within the range from 5 or 10 or 15 or 20 to 40 or 45 or 50 or 55 or 60 wt %, based on the weight of exfoliating agent and elastomer.

11. The method of any one of numbered embodiments 8-10, wherein the layered filler has an aspect ratio of greater than 30 or 40 or 50 or 60, or within the range from 30 or 40 or 50 to 90 or 100 or 120 or 140.

12. The method of any one of the previously numbered embodiments, wherein the solvent is removed from the nanocomposite composition prior to combining the nanocomposite with the one or more process oils and the curative composition.

13. The method of any one of the previously numbered embodiments, wherein the permeation coefficient of the innerliner is less than 200 or 180 or 160 cc·mm/(m$^2$-day).

14. The method of any one of the previously numbered embodiments, wherein naphthenic oils are substantially absent.

15. The method of any one of the previously numbered embodiments, further comprising from 1 or 2 or 3 to 6 or 8 or 10 or 12 phr of one or more phenolic resin.

16. The method of any one of the previously numbered embodiments, further comprising from 2 or 3 or 4 or 5 to 8 or 10 or 12 or 15 phr of a hydrocarbon tackifier.

17. The method of any one of the previously numbered embodiments, further comprising within the range from 20 or 30 or 40 or 50 to 70 or 80 or 90 phr of carbon black.

18. Producing a tire comprising the innerliner of any one of the previously numbered embodiments.

19. An innerliner comprising an elastomeric nanocomposite, the elastomeric nanocomposite comprising a functionalized poly(isobutylene-co-p-methylstyrene) elastomer with one or more layered fillers, and within the range from 1 or 2 to 4 or 5 or 6 or 7 or 8 phr of one or more processing aids.

20. The innerliner of numbered embodiment 19, wherein the components are dissolved/slurried in a solvent.

21. The innerliner of numbered embodiment 19 or 20, wherein the elastomeric nanocomposite is a solid composition.

22. The innerliner of numbered embodiment 21, wherein naphthenic oils are substantially absent.

23. The innerliner of numbered embodiment 21, further comprising from 1 or 2 or 3 to 6 or 8 or 10 or 12 phr of one or more phenolic resin.

24. The innerliner of numbered embodiment 21, further comprising from 2 or 3 or 4 or 5 to 8 or 10 or 12 or 15 phr of a hydrocarbon tackifier.

25. The innerliner of numbered embodiment 21, further comprising within the range from 20 or 30 or 40 or 50 to 70 or 80 or 90 phr of carbon black.

Also disclosed is the use of nanocomposite in an innerliner for a pneumatic tire, the innerliner made by the process comprising contacting a functionalized poly(isobutylene-co-p-methylstyrene) elastomer with one or more layered fillers, and within the range from 1 or 2 to 4 or 5 or 6 or 7 or 8 phr of one or more processing aids, and one or more solvents to form a nanocomposite composition; precipitating the nanocomposite composition; and forming an innerliner suitable for the tire; wherein the functionalized poly(isobutylene-co-p-methylstyrene) elastomer is dispersed in a first solvent to form a first solvent mixture, and separately, the one or more layered fillers is dispersed in a second solvent to form a second solvent mixture, followed by combining the two solvent mixtures to form a nanocomposite solvent mixture; followed by combining the one or more processing aids with the nanocomposite mixture to form the nanocomposite composition.

We claim:

1. A method of forming an innerliner for a tire comprising:
   contacting a functionalized poly(isobutylene-co-p-methylstyrene) elastomer, one or more layered fillers, and 1 to 8 phr of one or more processing oils, in the presence of one or more solvents to form a nanocomposite composition;
   precipitating the nanocomposite composition; and
   forming an innerliner comprising the precipitated nanocomposite composition.

2. The method of claim 1, wherein the functionalized poly(isobutylene-co-p-methylstyrene) elastomer is dispersed in a first solvent to form a first solvent mixture, and separately, the one or more layered fillers is dispersed in a second solvent to form a second solvent mixture, followed by combining the two solvent mixtures to form a nanocomposite solvent mixture; followed by combining the one or more processing oils with the nanocomposite solvent mixture to form the nanocomposite composition.

3. The method of claim 2, wherein the first solvent mixture has a first solvent to elastomer ratio, by weight, within the range of from 1 to 50, and the second solvent mixture has a second solvent to filler ratio, by weight, within the range of from 5 to 200.

4. The method of claim 1, wherein the nanocomposite composition is further dried at a temperature of at least 65° C. prior to forming the innerliner.

5. The method of claim 1, wherein the functionalized poly(isobutylene-co-p-methylstyrene) elastomer has a Mooney Viscosity (ML1+4) of less than 50.

6. The method of claim 1, wherein the functionalized poly(isobutylene-co-p-methylstyrene) elastomer has a p-methylstyrene-derived content within the range from 4 to 17 wt %, by weight of the elastomer.

7. The method of claim 1, wherein the amount of the one or more layered fillers is within the range from 5 to 25 phr.

8. The method of claim 1, wherein the nanocomposite composition also comprises an exfoliating agent.

9. The method of claim 8, wherein the exfoliating agent has a weight average molecular weight of less than 5000 amu.

10. The method of claim 8, wherein the exfoliating agent is present within the range from 5 to 60 wt %, based on the weight of exfoliating agent and elastomer.

11. The method of claim 8, wherein the layered filler has an aspect ratio of greater than 30.

12. The method of claim 1, wherein the permeation coefficient of the innerliner is less than 200 cc·mm/(m$^2$·day).

13. The method of claim 1, wherein naphthenic oils are substantially absent in the innerliner.

14. The method of claim 1, further comprising from 1 to 12 phr of one or more phenolic resin.

15. The method of claim 1, further comprising from 2 to 15 phr of a hydrocarbon tackifier.

16. The method of claim 1, further comprising within the range from 20 to 90 phr of carbon black.

17. A method of forming an elastomeric nanocomposite comprising the steps of:
    contacting a functionalized poly(isobutylene-co-p-methylstyrene) elastomer, one or more layered fillers, and 1 to 8 phr of one or more processing oils, in the presence of one or more solvents to form a nanocomposite composition; and
    removing the solvents to recover the elastomeric nanocomposite.

18. The method of claim 17, wherein the process oil is selected from petroleum and vulcanized vegetable oils, mineral oils, paraffinic oils, polybutene polymers, naphthenic oils, and aromatic oils.

19. The method of claim 17, wherein naphthenic oils are substantially absent.

20. The method of claim 17, wherein the functionalized poly(isobutylene-co-p-methylstyrene) elastomer is dispersed in a first solvent to form a first solvent mixture, and separately, the one or more layered fillers is dispersed in a second solvent to form a second solvent mixture, followed by combining the two solvent mixtures to form a nanocomposite solvent mixture; followed by combining the one or more processing oils with the nanocomposite mixture to form the nanocomposite composition.

21. The method of claim 17, wherein the first solvent mixture has a first solvent to elastomer ratio, by weight, within the range of from 1 to 50, and the second solvent mixture has a second solvent to filler ratio, by weight, within the range of from 5 to 200.

22. The method of claim 17, wherein the nanocomposite composition is further dried at a temperature of at least 65° C. prior to forming the innerliner.

23. The method of claim 17, wherein the functionalized poly(isobutylene-co-p-methylstyrene) elastomer has a Mooney Viscosity (ML1+4) of less than 50.

24. The method of claim 17, wherein the amount of the one or more layered fillers is within the range from 5 to 25 phr.

25. The method of claim 17, wherein the nanocomposite composition also comprises an exfoliating agent.

26. The method of claim 17, wherein water is not added to the contacting step.

* * * * *